United States Patent [19]

Colinet

[11] 4,030,379
[45] June 21, 1977

[54] LEVER OPERATED CONTROL DEVICE

[75] Inventor: Andre Colinet, Boulogne-Billancourt, France

[73] Assignees: Regie Nationale des Usines Renault, Hauts de Seine; Automobiles Peugeot, Paris, both of France

[22] Filed: Apr. 22, 1975

[21] Appl. No.: 571,000

[30] Foreign Application Priority Data
May 2, 1974  France .............................. 74.15219

[52] U.S. Cl. .................................. 74/522; 74/102; 74/103; 74/519
[51] Int. Cl.² ......................................... G05G 1/04
[58] Field of Search ................. 74/522, 501 R, 469, 74/519, 103, 102, 99 R

[56] References Cited
UNITED STATES PATENTS

| | | | |
|---|---|---|---|
| 564,228 | 7/1896 | Sparling | 74/102 |
| 654,643 | 7/1900 | Johnson | 74/102 X |
| 1,182,816 | 5/1916 | Taft | 74/102 |
| 1,270,068 | 6/1918 | Stevens et al. | 74/102 |

*Primary Examiner*—Samuel Scott
*Assistant Examiner*—Randall Heald
*Attorney, Agent, or Firm*—Fleit & Jacobson

[57] ABSTRACT

A lever operated control device has a control portion lying adjacent, and adapted to move parallel to a motor vehicle control panel. The control device has an elongated control lever having a first end and a second end, the control portion being located at the first end for movement of the control lever. A restraining lever has one end pivotally mounted on a movable axis of the control lever, and an opposite end pivotally mounted on a fixed axis. The control lever is designed to move pivotally about its second end along with simultaneous longitudinal movement.

7 Claims, 6 Drawing Figures

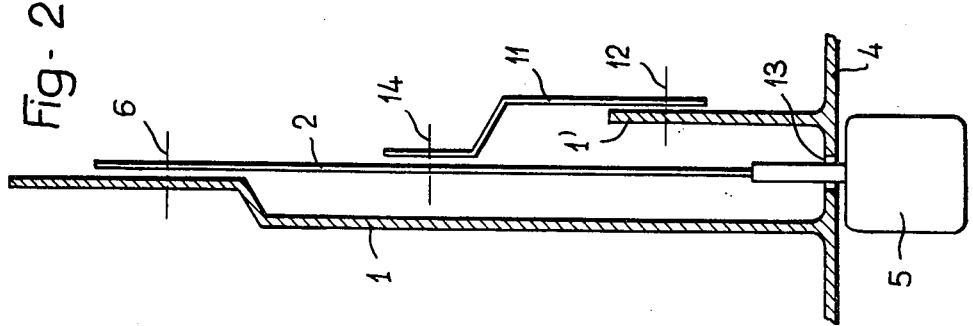
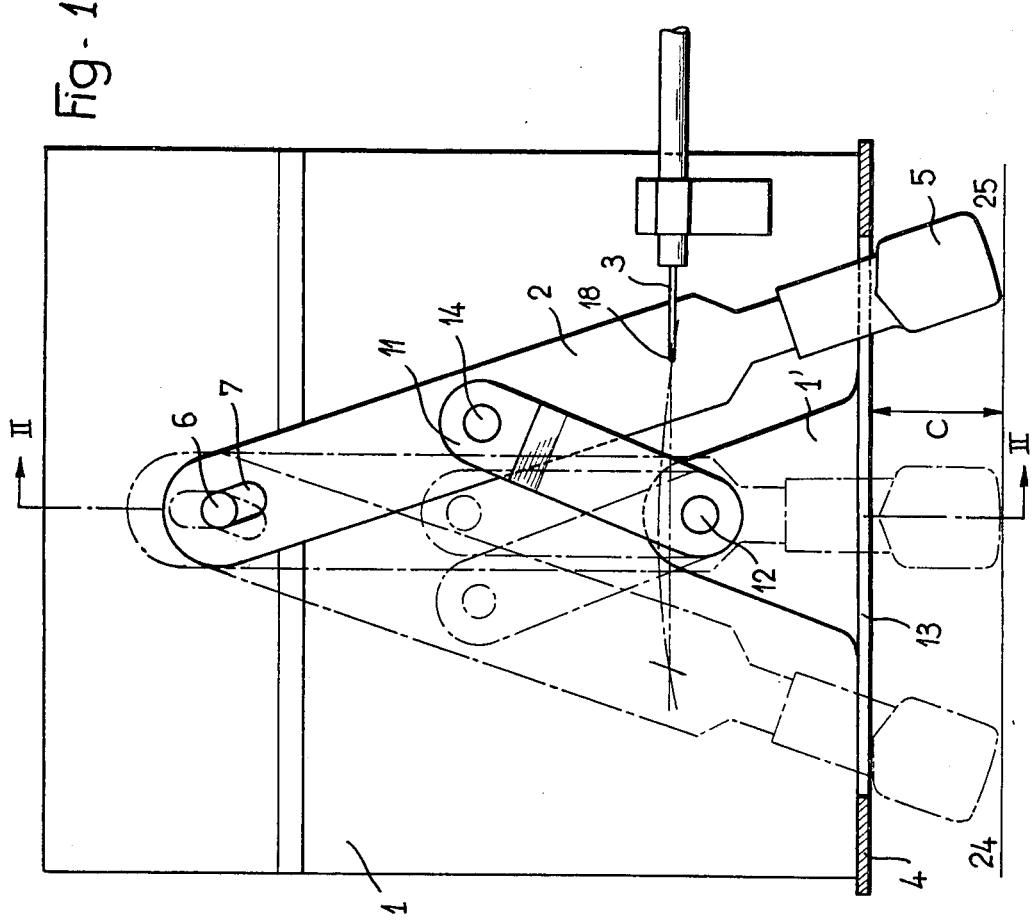

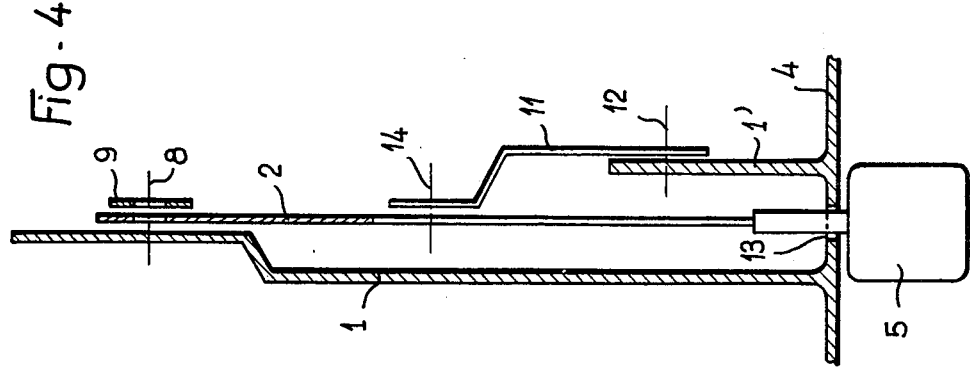
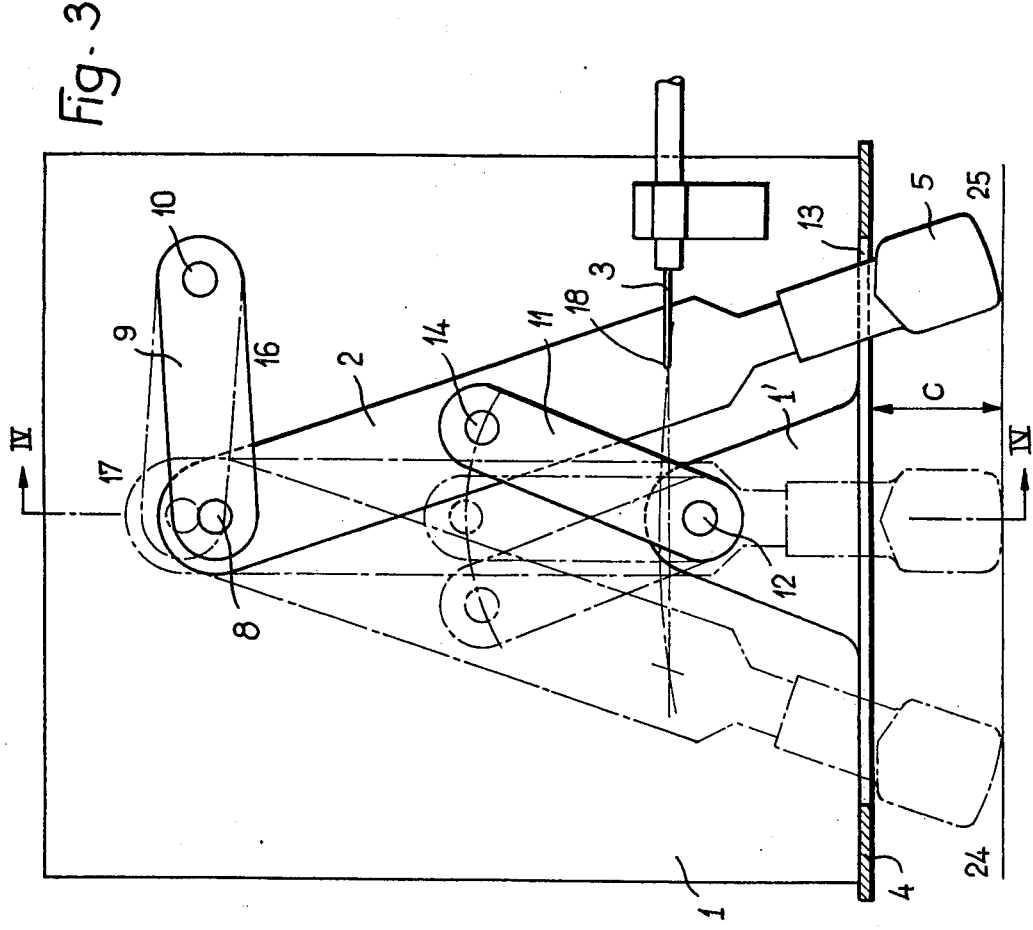

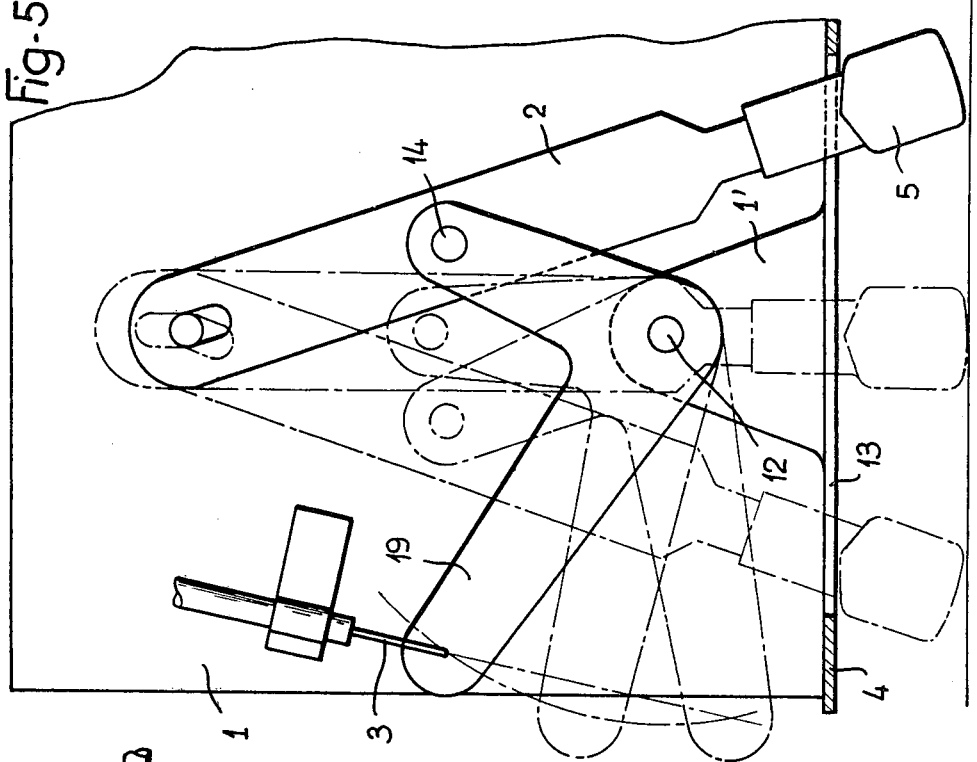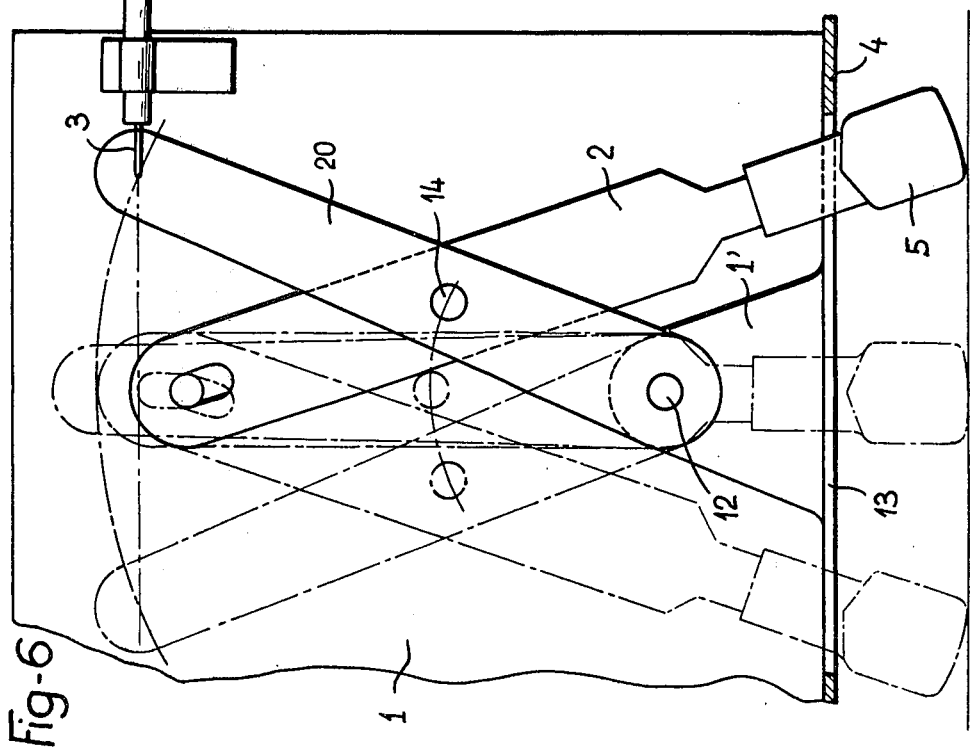

LEVER OPERATED CONTROL DEVICE

The present invention relates in general to lever operated control devices and specifically relates to a control device which meets the safety requirements in connection with instrument panels of motor vehicles.

The lever control devices frequently used in motor vehicles, notably for the various air-conditioning and heating systems, are mostly of the pivoting lever type, wherein a lever is fulcrumed to a pin rigid with a support, the finger-grip portion of the lever emerging from a front grille opening disposed substantially at right angles to said support, so that said grip portion, or knob, projects considerably inside the passenger compartment of the vehicle, that is, by an amount corresponding to the sagitta of the circular arc path defined by the pivoting lever about its fulcrum.

Recent safety rules have been promulgated in order to regulate all parts likely to project inside the passenger compartment of motor vehicles. These rules require that this sagitta be reduced considerably so that the grip portion of any control lever, which comprises a knob having dimensions and hardness consistent with the new regulations, can move along a path substantially parallel to the front face of the panel, grille or opening through which it emerges.

Various solutions have been proposed to deal with this problem; notably flush-mounting the control levers without changing their pivotal movement in said front panel, grille or opening, or surrounding the levers with a protection padding, which is not always compatible with the various styles of instrument board or facia panels designed for specific vehicles.

Another known proposal requires using control members movable in slideways parallel to the front panel, but in this proposal the control effort cannot be reduced, the member must compulsorily follow (at least during the initial control movement) a path parallel to the front panel, and the risk of jamming the control devices is considerably increased due to the pronounced friction produced in the slideways.

One recently proposed solution to this problem requires using levers which, though fulcrumed to a pivot pin, are movable in their longitudinal direction along this pin by a distance corresponding to the saggita of the arc described by the projecting levers, the grip portion of each lever being guided by means of a stud rigid with the lever and movable in a slideway parallel to the front panel or grille. In this proposal the efforts are considerable and jammings due to the movement of the stud in the slideway have been observed. Further, the complicated kinematics of the lever about its fulcrum reduce the free portion of this lever which can be used for anchoring the controlled or driven, members, which members should preferably move along either a rectilinear path or a curved path of relatively great radius.

The present invention avoids the above problems by maintaining the pivotal movements of the lever free, or substantially free, of undesired frictional contacts, and causing the control knob at the driven end of the lever to follow a path substantially parallel to the front panel or grille. The member being controlled moves substantially or rectilinearly with a relatively large radius, without any limitation as to its circularly movement. The levers are of relatively reduced dimensions and the relative compactness of the control device permits easy installation behind the instrument panel or facia board of a motor vehicle.

More particularly, the present invention is directed to improve the arrangements proposed in prior art embodiments of lever operated control devices of the type set forth. This improvement provides for either a main lever adapted to pivot about a fulcrum pin carried by a fixed support, the pivotal movement occurring simultaneously with a longitudinal movement, by virtue of an elongated hole, or slot formed in said main lever in order to eliminate the excess projection of the control knob or a main lever adapted to pivot about a fulcrum pin rigid with a link disposed substantially perpendicular to the main lever in the intermediate mid-point position, pivoted to a pin rigid with a fixed support whereby the movement of said link will eliminate the excess projection of said control knob.

The present invention consists in adding a restraining link, or lever, pivoted about a fulcrum pin disposed between the theoretical fulcrum of the main lever and the front panel of the device, and aligned with the theoretical fulcrum of the main lever substantially on the bisector of the maximum angle through which the main lever is adapted to pivot. The restraining link is rotatably attached to the main lever at a point located between the two main pivot points of the two levers.

When actuating the main lever the restraining link remaintains the amount of projection of the grip portion or knob of the main lever at a substantially constant value in relation to the front or outer surface of the device during movement of the main lever.

A clearer understanding of this invention will be had as the following description proceeds, with reference to the attached drawings illustrating diagrammatically, typical embodiments of the lever operated control device of this invention. In the drawings:

FIG. 1 is a plan view of one embodiment of the device;

FIG. 2 is a section taken along the line II—II of FIG. 1;

FIG. 3 is a plan view of a second embodiment of the device;

FIG. 4 is a section taken along the line IV—IV of FIG. 2, and

FIGS. 5 and 6 are plan views illustrating modified embodiments of the device.

The control device comprises a fixed support 1, and one or more control levers 2 driving one or more transmission members 3. The control lever 2 extends through a front panel 4, the front panel 4 being substantially perpendicular to the support 1 and adapted to be secured to the inner or instrument panel of a motor vehicle (not shown). The projecting portion, or grip knob 5 of the control lever 1 is maintained at a constant distance C from said front panel 4 during movement. To this end, the control lever 2 is allowed to pivot about either a fulcrum pin 6 rigid with said support 1 while being allowed to move along its longitudinal direction with the assistance of an elongated hole 7 (FIG. 1), or a fulcrum pin 8 rigid with a link 9 pivoted in turn to a pin 10 rigid with said support 1 (FIG. 3).

Parallel to and rigid with the support 1 is a lug 1' also rigid with the front panel 4. A restraining link 11 is pivoted at one end by means of a pin 12 rigid with said lug 1' and aligned with the pivot pin 6 or 8 of the control lever 2. Both pins 12 and 6 or 8 are disposed on the bisector of the maximum angle through which the control lever 2 can be moved, the maximum angle being limited by the width of the slot 13 formed in the front panel 4. The restraining link 11 is pivoted at a point 12 located between the pivot pin 8 or 6 of the control lever 2 and the front panel 4.

The restraining link 11 coacts with the control lever 2 by means of another pivot pin 14 located on the control lever between the pivot pins 8 or 6 and 12.

This lever operated device for controlling various transmission or driven members operates as follows: During the movement of the main lever 2 actuated by means of its projecting or grip knob 5 between the extreme positions 24 and 25, the restraining link 11 connected by pivot pin 14 to the main control lever 2 causes said control lever 2 to either move in its longitudinal direction along the pin 6, with the assistance of the elongated hole, or slot, 7 (FIG. 1), or pivot the link 9 about the pivot pin 10 from position 16 to position 17, and vice versa (FIG. 3). During this movement, the grip knob 5 of main lever 2, which emerges from the front panel 4 does not project therefrom beyond the distance C. The transmission member 3 anchored at 18 to control lever 2 between the pivot pin 14 and the front panel 4 is thus moved along either a straight path or a curved path of relatively large radius.

In a modified embodiment of the device the restraining link 4 may comprise either an arm 19 to form a bell-crank lever (FIG. 5) or a straight extension 20 (FIG. 6) when it is desired to drive a transmission member in alternative directions relative to the front panel 4.

Of course, various modifications and changes may be brought to the devices described and illustrated herein without departing from the basic principles of the invention as set forth in the appended claims, as will readily occur to those skilled in the art.

What is claimed as new is:

1. In a lever operated control mechanism wherein a control portion lies adjacent to and is adapted to move parallel to a control panel, a control device comprising: an elongated control lever having a first end and a second end; a control portion at the first end of said control lever; a restraining lever; first pivot means for pivotally mounting one end of said restraining lever on a movable axis located on said control lever between said first and second ends; second pivot means for pivotally mounting the other end of said restraining lever on a fixed axis; and limiting means at the second end of said control lever for limiting movement of said control lever to simultaneous pivotal movement about its second end and longitudinal movement.

2. The control device of claim 1, wherein said limiting means comprises a fixed pin and an elongated slot at the second end of said control lever; and wherein said pin extends through said elongated slot.

3. The control device of claim 1, wherein said limiting means comprises a link, third pivot means for pivotally mounting one end of said link on a movable axis located on said control lever at the second end thereof, and fourth pivot means for pivotally mounting the other end of said link on a fixed axis.

4. The control device of claim 3, wherein said control lever is adapted to move between a first position and a second position, and said link is perpendicular to said control lever when said control lever is in an intermediate position between said first position and said second position.

5. The control device of claim 1, wherein said control lever is adapted to move between a first position and a second position, and said restraining lever is parallel to said control lever when said control lever is in an intermediate position between said first position and said second position.

6. The control device of claim 1, and further comprising a transmission member connected to said control lever.

7. The control device of claim 1, wherein said restraining member further comprises an extension member integral therewith, and a transmission member connected to said extension member.

* * * * *